United States Patent
Büttner et al.

(10) Patent No.: US 10,700,582 B2
(45) Date of Patent: Jun. 30, 2020

(54) ROTOR BAR FOR SQUIRREL-CAGE ROTOR, AND SQUIRREL-CAGE ROTOR PROVIDED WITH ROTOR BAR

(75) Inventors: Klaus Büttner, Hollstadt (DE); Michael Müller, Bad Kissingen (DE); Norbert Wöhner, Heustreu (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 1115 days.

(21) Appl. No.: 13/876,880

(22) PCT Filed: Sep. 29, 2011

(86) PCT No.: PCT/EP2011/066954
§ 371 (c)(1),
(2), (4) Date: Mar. 29, 2013

(87) PCT Pub. No.: WO2012/041943
PCT Pub. Date: Apr. 5, 2012

(65) Prior Publication Data
US 2013/0187512 A1 Jul. 25, 2013

(30) Foreign Application Priority Data

Sep. 30, 2010 (DE) .................. 10 2010 041 788
Sep. 30, 2010 (DE) .................. 10 2010 041 795
Sep. 30, 2010 (DE) .................. 10 2010 041 796

(51) Int. Cl.
*H02K 17/16* (2006.01)
*H02K 15/02* (2006.01)
*H02K 15/00* (2006.01)

(52) U.S. Cl.
CPC ....... *H02K 17/165* (2013.01); *H02K 15/0012* (2013.01)

(58) Field of Classification Search
CPC ...... H02K 17/16; H02K 17/165; H02K 17/18; H02K 17/185; H02K 17/20
(Continued)

(56) References Cited

U.S. PATENT DOCUMENTS 2,384,489 A  9/1945  Pancher
2,784,333 A  3/1957  Gunselman
(Continued)

FOREIGN PATENT DOCUMENTS

CA  1119651 A1 *  3/1982  ............. H02K 17/16
CH   683957 A5 *  6/1994  ........... H02K 17/165
(Continued)

OTHER PUBLICATIONS

Machine Translation, AIGA, JP 2007228798 A, Sep. 6, 2007.*
(Continued)

*Primary Examiner* — Thomas Truong
(74) *Attorney, Agent, or Firm* — Henry M. Feiereisen LLC

(57) ABSTRACT

A squirrel-cage rotor of an asynchronous machine has a rotor bar (4) in a rotor stack (1), wherein the bar (4) can be tipped at a tipping point (11, 12, 13) when the bar (4) has not yet been cast. The rotor bar (4) can in this case have a contour on a radial outer face, wherein the bar (4) can also have a channel (27), the opening (29) in said channel being wider than the shoulders (32, 33) of the limbs (30, 31) which form the channel (27).

22 Claims, 15 Drawing Sheets

(58) Field of Classification Search
USPC .................................................. 310/211, 212
IPC ............................ H02K 017/16, 017/18, 017/20
See application file for complete search history.

(56) References Cited

U.S. PATENT DOCUMENTS

| | | | |
|---|---|---|---|
| 5,444,319 A * | 8/1995 | Nakamura | H02K 17/165 |
| | | | 29/598 |
| 2004/0113508 A1* | 6/2004 | Yasuhara et al. | 310/211 |
| 2006/0163969 A1* | 7/2006 | Nemoto et al. | 310/261 |
| 2007/0210667 A1 | 9/2007 | Vogel | |
| 2011/0316380 A1* | 12/2011 | Buttner et al. | 310/211 |

FOREIGN PATENT DOCUMENTS

| | | | |
|---|---|---|---|
| CN | 1886884 A | | 12/2006 |
| DE | 10 13 358 A | | 8/1957 |
| DE | 11 16 311 A | | 11/1961 |
| DE | 30 31 159 A1 | | 4/1982 |
| DE | 43 08 683 A1 | | 9/1994 |
| EP | 649211 A2 | * | 4/1995 |
| JP | 53114007 A | * | 10/1978 |
| JP | 57106358 A | | 7/1982 |
| JP | 61069343 A | * | 4/1986 |
| JP | 06284608 A | * | 10/1994 |
| JP | 8 223 878 A | | 8/1996 |
| JP | 10 028 360 A | | 1/1998 |
| JP | 10322990 A | * | 12/1998 |
| JP | 2005278372 A | * | 10/2005 |
| JP | 2007228798 A | * | 9/2007 |
| WO | WO 2010/100 007 A1 | | 9/2010 |
| WO | WO 2010100007 A1 | | 9/2010 |

OTHER PUBLICATIONS

USPTO Translation, Hanai et al., JP 61069343, Apr. 9, 1986.*
Machine Translation, Viggiano, CH 683957 A5, Jun. 15, 1994.*
Machine Translation, Naruse et al., JP 10322990 A, Dec. 4, 1998.*
Machine Translation, Nakamura, JP-53114007-A, Oct. 1978. (Year: 1978).*
International Search Report issued by the European Patent Office in International Application PCT/EP2011/066954.
Lyschick, U.S. Pat. No. 7,780,108, Aug. 24, 2010, 2008/0296427, Dec. 4, 2008.
Lyschick, U.S. Pat. No. 7,745,969, Jun. 29, 2010, 2009/0127968, May 21, 2009.
Wöhner, 2008/0197718, Aug. 21, 2008.

* cited by examiner

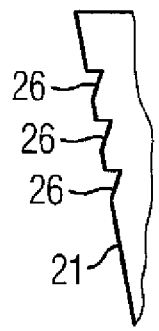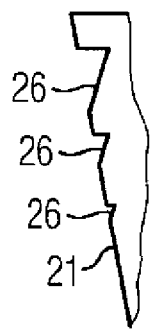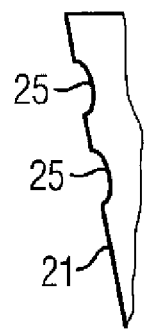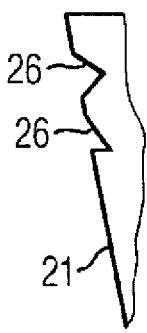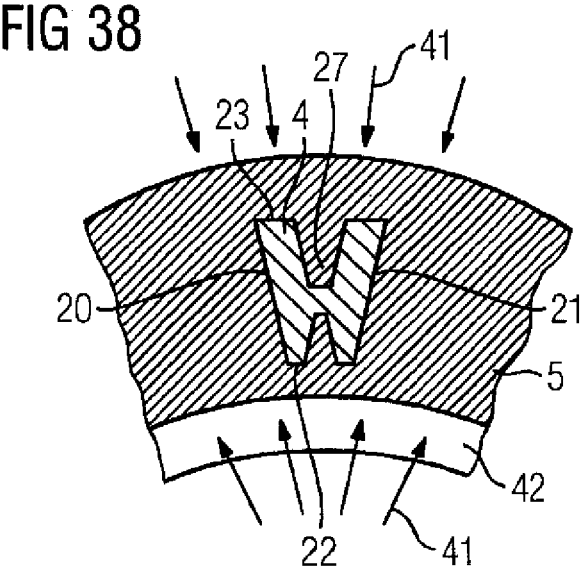

ROTOR BAR FOR SQUIRREL-CAGE ROTOR, AND SQUIRREL-CAGE ROTOR PROVIDED WITH ROTOR BAR

The invention relates to a squirrel-cage rotor for an asynchronous machine, to cage rotor bars, and to an asynchronous machine.

A squirrel-cage rotor is known from DE 43 08 683 A1. Said rotor includes a core stack having slots into which short-circuit bars made of copper are first inserted. The copper bars are connected to one another at their end faces by short-circuit rings. Said short-circuit rings are produced from aluminum by a die-casting method. The residual cross-section remaining in the slots opposite the inserted copper bars is simultaneously filled with aluminum when the short-circuit rings are cast so that the short-circuit rings will be bonded to the die-cast bar parts formed in the residual cross-section.

Because copper has a very much higher electrical conductivity than aluminum, the efficiency of an asynchronous machine of such kind can in that way be decisively improved compared with an asynchronous machine having a squirrel-cage rotor consisting entirely of die-cast aluminum material.

While in operation, the asynchronous machine and hence also the squirrel-cage rotor pass through thermal cycles that are dependent on the electrical losses inside the machine. The consequence in the rotor is a thermal expansion which owing to the different coefficients of thermal expansion of aluminum and copper is inhomogeneous in the case of a squirrel-cage rotor of such kind. The copper bars can consequently become detached from the die-cast aluminum material of the short-circuit rings, as a result of which the electrical transition conductivity between the short-circuit rings and rotor bars will in the end be poorer.

Similar efficiencies as in the case of the above-described squirrel-cage rotors produced using aluminum die-casting methods can be realized by means of a die-cast copper rotor. As it consists entirely of copper, the above problems relating to different coefficients of thermal expansion will not arise. However, the copper die-casting process is very expensive and places demanding requirements on the die-casting tools because copper has to be heated to temperatures above 1000° C. for the die-casting process. With aluminum, by contrast, it is possible to work at very much lower temperatures during die-casting. Moreover, a squirrel-cage rotor consisting entirely of copper is heavier, and so in terms of its starting characteristics is slower than the squirrel-cage rotor known from DE 43 08 683 A1 having short-circuit rings made of aluminum.

Another asynchronous machine having a squirrel-cage rotor is known from WO 2010/100007. In order to increase electrical efficiency in the case of a short-circuit rotor consisting of two materials said rotor includes:
  a laminated rotor core having slots,
  short-circuit rings made of a first material that are cast onto the laminated rotor core at its end faces, and
  conductors arranged in the slots and made of a second material having a higher specific electrical conductivity than that of the first material,
wherein the conductors have on their surface a coating that is made of a coating material and which via a first alloy layer made of the second material and the coating material adjoins the second material of the conductors and via a second alloy layer made of the first material and coating material adjoins the cast first material.

If a squirrel-cage rotor has for its cage at least two different electrically conducting materials such as aluminum and copper, said squirrel-cage rotor can be referred to also as a hybrid rotor. Preferably copper bars are therein inserted into a laminated rotor core and when the short-circuit ring is cast using aluminum are encapsulated along with it in the laminated rotor core. The operating data of an asynchronous machine having a hybrid rotor is dependent on the embodiment of the bond between the inserted molding (rotor bar made of copper) and the short-circuit ring. The quality of the short-circuit ring and the bond achieved between the components used are in turn dependent on the casting process and how well the free volume has been filled. Improving the casting process will enable motors having better operating data to be produced and result in improved efficiency with the same core-stack length.

In the case of a hybrid rotor the short-circuit ring contracts during the cooling process after die-casting. That gives rise to extreme pressure forces acting on the topsides of the inserted copper bars. The aluminum ring likewise contracts on the inside of the short-circuit ring. Because the rotor bar in the laminated rotor core is seated in the slot base and the core stack very firmly limits any movement in the direction of the shaft, the bar cannot follow the yielding inner region of the short-circuit ring. Bars furthermore exhibit enormous rigidity in the radial direction so that plastic deformation of the bars is virtually precluded. That can result partially in the formation of a fissure in the bar's lateral flanks and lower part. That increases overall transition resistance, which impacts disadvantageously on the performance and durability of the asynchronous machine.

To improve the quality of a squirrel-cage rotor, attention can furthermore also be directed to the precise positioning of the bars, preferably evenly in the slot base of the laminated rotor core for achieving a laminated rotor core exhibiting low imbalance characteristics. The place where the rotor bar (molding) joins the short-circuit ring is moreover as already described crucially responsible for the operating data. Improving it will result automatically in better electrical data in efficiency terms especially.

The squirrel-cage rotor is subjected to great centrifugal forces while an asynchronous machine is operating which can damage the squirrel-cage rotor and so can negatively influence the durability and/or service life of the asynchronous machine. It is therefore advantageous for the components to have stable mechanical connections. That particularly concerns components that are electrically conducting.

An object of the invention is to improve the quality of an asynchronous machine, a squirrel-cage rotor and a rotor bar. An object of the invention can further be seen in providing measures for surmounting or diminishing at least one of the above problems.

Said object is achieved in accordance with a main claim of the present application. Advantageous embodiments will emerge from the dependent claims.

To improve the electrical efficiency of a short-circuit rotor it can employ two electrically conducting materials for the cage, with the cage advantageously also being produced by means of a die-casting method.

A squirrel-cage rotor can be embodied such as to include:
  a laminated rotor core having slots,
  short-circuit rings made of a first material that are cast onto the laminated rotor core at its end faces, and
  conductors arranged in the slots and made of a second material having a higher specific electrical conductivity than that of the first material.

The first material is preferably aluminum or an aluminum alloy. The second material is preferably copper or a copper alloy.

In an embodiment, the conductors therein have on their surface a coating made of a coating material, with the coating material possibly being the other material.

The production of a squirrel-cage rotor for an asynchronous machine can include the following method-related steps:
  inserting conductors (rotor bars) made of a second material (in particular copper) into slots in a laminated rotor core, and
  casting short-circuit rings made of a first material (in particular aluminum) having a lower specific electrical conductivity than that of the second material onto the laminated rotor core at its end faces.

The short-circuit bars project from the laminated rotor core at both its end faces and into the cast short-circuit rings. An increase in the binding forces between conductor ends and short-circuit rings can be achieved through the creation of a mixed-crystalline bond between the materials.

In an embodiment of a squirrel-cage rotor, the laminated rotor core's slots fitted with the rotor bars (conductors) are filled with the first material by means of a die-casting method, with the short-circuit rings having been produced using the die-casting method. The bars will thereby be fixed in the slots on the radially inwardly oriented slot base. The rotor bar and the hardened casting in the slot form a cage bar of the squirrel-cage rotor.

Temperatures of up to around 150° C. will be reached as the squirrel-cage rotor heats up during operation. That causes thermal expansion in the slot regions filled with the first material, especially when the first material is aluminum. That can lead to a disengagement at the transition between the conductors and short-circuit rings, as a result of which the electrical conductivity in the region of the transition between the short-circuit rings and the conductors will be poorer. The laminated rotor core axially pressed together during the die-casting method for reasons of sealing will be able to open out again axially if the bond between the conductors and the cast short-circuit rings is unable to provide a sufficient holding force.

Because of the coating the conductors can be bonded to the die casting by maximum possible bonding forces. The bond between the conductors and the short-circuit rings will accordingly remain stable despite the different coefficients of thermal expansion of the first and second material even when the squirrel-cage rotor goes through pronounced thermal cycles during operation. At high rotational speeds the centrifugal forces acting upon the rotor will also give rise to in part intense stresses in the conductor/short-circuit ring. Optimal electrical transition conductivity between the first and second material will furthermore be achieved by the alloy.

If the cage of the squirrel-cage rotor employs aluminum and copper as its electrically conducting materials then the result will also be an economically favorable solution in cost terms. A hybrid squirrel-cage rotor exhibits good electrical efficiency owing to its conductors made of copper and is easier to produce than a die-cast copper rotor. Compared with a die-cast copper rotor the hybrid rotor has less mass and hence a smaller moment of inertia because its short-circuit rings have been produced from relatively light aluminum. The efficiency of an asynchronous machine can consequently be improved by means of a hybrid rotor. To produce a squirrel-cage rotor of such kind, for example first the rotor bars made of copper (copper conductors) are inserted into the slots of the laminated rotor core. The region of the slots that is not taken up by the rotor bars is then filled using an aluminum die-casting method. The short-circuit rings made of aluminum are simultaneously produced advantageously by means of the die-casting method.

In an embodiment of a squirrel-cage rotor the bond between the rotor bars and the short-circuit rings can be strengthened in that at both ends the rotor bars have in each case an end region projecting out of the laminated rotor core and into the short-circuit rings and have form-fitting means for producing a form fit between the conductors and cast short-circuit rings. The bond between the conductors and the short-circuit rings will be further strengthened by said form-fitting means in the end regions of the conductors. The conductors projecting from the ends are axially braced against the short-circuit rings by the form-fitting means. The conductors will hence be subjected to a tensile or compressive stress depending on the temperature and on the coefficients of thermal expansion of the conductors and short-circuit rings. The short-circuit rotor must therein be designed such that the stress remains always within the elastic region. Because of the form-fitting means employed, a displacement of the conductors within the short-circuit rings will be obviated and the conductors will be prevented from being pulled out of the short-circuit rings, as a result of which the join between the two materials can be prevented from tearing. Conceivable form-fitting means are for example through-holes in the end regions of the conductors that will be filled by the molten material during the casting process. Conceivable also as form-fitting means instead of a through-hole are recesses in the end regions, conductors that are tapered within the end regions, notches, knurling on the end regions, conductors that are twisted in the end regions, or conductors that are split in the end regions. Possible also are a plurality of through-holes in the end region of the rotor bar (copper bar). In an embodiment variant a through-hole extends from the region of the short-circuit ring into the region of the laminated rotor core. The through-hole is filled with casting material over the part in the region of the short-circuit ring. Thermally induced stresses occurring in the transitional region between laminated rotor core and short-circuit ring can be reduced owing to the overlap.

To improve the mechanical stability of a rotor bar in the squirrel-cage rotor the rotor bar can be provided with an advantageous contour. Said contour can run end-to-end in the axial direction or it can be present only partially. The formative geometries of the applied contour will enlarge radially outwardly oriented face of the respective rotor bar.

In an embodiment of a rotor bar of a squirrel-cage rotor of an asynchronous machine, said bar advantageously has a contour on radial outer faces. The radial outer faces are areas situated circumferentially opposite other radial outer faces of other rotor bars. The contour can have, for example, a groove or a plurality of grooves. The grooves enlarge the surface and so improve the adhesion between rotor bar and casting material that is introduced as molten material into the slots of the laminated rotor core.

Grooves can have different cross-sections such as, for example, an arched cross-section and/or a wedge-shaped cross-section.

The contour of the rotor bails) or, as the case may be, the grooves therein have an orientation. Said orientation can be, for example, axial relative to a rotational axis of the squirrel-cage rotor. In another embodiment the orientation can be, for example, oblique relative to the rotational axis.

In another embodiment of a rotor bar its grooves can also intersect one another or be tangent to one another. Contour patterns ensuing therefrom can advantageously contribute to improving adhesion.

A rotor bar can have the contour in different regions, such as:
in the region of the short-circuit ring and/or
in the region of a laminated rotor core.

A rotor bar can just have the described contours on radial outer faces for improving the quality of a short-circuit rotor or it can also have other features such as are described below. Said other features can also be present singly on a rotor bar or a short-circuit rotor, or in combination with a plurality of features.

A rotor bar can be embodied such as to have an axial channel. The axial channel is therein located in a region of the rotor bar which in the mounted condition is oriented advantageously radially outwardly in the squirrel-cage rotor. The channel is therefore located in the region of an area that can be designated a tangential outer face of the rotor bar.

In an embodiment of the rotor bar said bar has an axial channel, wherein the channel has a depth, an opening width, a first limb having a first shoulder and a second limb having a second shoulder, wherein the opening width is greater than the shoulder width. What is achieved thereby is that the channel walls will not be rigid. The limbs form walls of the channel, with its being possible for the thickness of the walls to vary over the cross-section. The shoulder width therein defines a wall thickness of the limbs.

There is advantageously an axially end-to-end channel in the radially outwardly located face of the rotor bar (it is therein particularly a molding). A specific contour of the rotor bar is formed by the channel, with its also being possible for the channel to be a slot provided in the rotor bar. The channel contour has a width and depth and a radially outwardly oriented opening angle. In the case of double-bar rotors for example the position of the channel is oriented centrally relative to a scatter-web opening. An end-to-end cross-sectional area for the molten material is provided thereby.

The channel in the mounted rotor bar acts in the case of deep-bar rotors like a second casting channel. As there are no laminations in it there are no disturbance points. Said disturbance points create turbulences in the molten material while the core stack is being filled. The casting result will therefore be improved when the channel in the rotor bar is used.

When the position of the channel is oriented on the scatter-web opening the result in the case of double-bar rotors will be a continuous casting channel consisting of the area of the cam slot and the remaining area of the operating slot. The partial areas can thereby support one another during die-casting. Congealing may occur within the core stack in the case of areas that are separate because partial areas may not have a size that is sufficient for embodying the rotor bar. Here, too, the channel in the rotor bar acts in the mounted molding like a second casting channel. As there are no laminations in it there are no disturbance points. Said disturbance points create turbulences in the molten material while the core stack is being filled. The casting result will therefore be improved when the channel in the rotor bar is used. The channel of the rotor bar is an open channel, a closed overall channel being present as a result of the rotor bar's being inserted into the slot in the laminated rotor core.

Owing to the contour of the channel there is a build-up of pressure inside the core stack as a function of the channel's formative geometries, in particular its opening angle alpha. Said build-up produces a radially acting force that positions the rotor bar in the radial direction inwardly into the slot base of the laminated rotor core. The original imbalance of the squirrel-cage rotor can be reduced my means of that process.

The molten material will be prevented from penetrating between core stack and radial inwardly situated molding area (radial outer face) by suitable positioning of the rotor bars in the slots of the squirrel-cage rotor's core stack and by appropriately selecting the size of the limbs of the rotor bars as compared with the channel opening in the rotor bars. That will result in a reduction in the transverse currents. That will result in better operating characteristics during startup and in improved efficiency when the motor is under load around the nominal operating point.

Contracting of the molten material onto the walls of the rotor bar's channel affects the quality of the bond between inserted rotor bar and solidified molten material. That area's enlargement produced by the contour will result automatically in an improvement to the linking system between inserted rotor bar and solidified molten material. The consequence will be a mechanically more stable bond. That will moreover reduce the overall cage resistance. That will be expressed in reduced slippage and hence an improvement in efficiency.

In an embodiment of the rotor bar the depth of the channel can correspond to 0.73 times to 3 times the opening width of the rotor bar's channel.

In another embodiment of the rotor bar an opening angle having a value of 25° to 50° is produced by the first limb and the second limb. The opening angle can be constant along the axial length of the rotor bar or can vary.

In an embodiment of the rotor bar the channel's depth is greater than half the rotor bar's height. The elasticity of the limbs (channel walls) can possibly be increased thereby to enhance the sealing effect by so doing. The molten material will be pressed into the laminated rotor core's slots under pressure. The rotor bar will be pressed into the laminated rotor core's slot because of the pressure. Because there is molten material also in the rotor bar's channel, the molten material will press the limbs against the side walls of the slot in the laminated rotor core so that a sealing effect will be achieved. Pressure will also be exerted on the rotor bar's shoulders by the molten material. Said pressure is oriented in the direction of the squirrel-cage rotor's axis because the shoulder areas are tangentially orientated. The rotor bar will be pressed into the base of the slot in the laminated rotor core by said pressure exerted on the shoulders.

A squirrel-cage rotor can accordingly be embodied such as to have a laminated rotor core that has slots (in the sense of passages or, as the case may be, breaches in the laminated rotor core), wherein rotor bars are positioned in the rotor slots, wherein the respective rotor bar occupies only a part of the respective rotor slot's cross-section, wherein a casting channel, meaning the molten material, is embodied such that casting material will be able to wet the shoulders. The pressure of the molten material will hence also act upon the shoulders.

In an embodiment of the squirrel-cage rotor the casting channel that is predefined by the slot (in the sense of passages or, as the case may be, breaches in the laminated rotor core) has a constriction. The constriction divides the casting channel into two regions. The rotor bar is to be placed in one region and what remains is to be filled with molten material; in the other region the slot is filled entirely with molten material. The rotor bars of the squirrel-cage rotor are therein made preferably of copper, whereas the molten material is preferably aluminum. The bar and the cast molten material jointly form the cage of the rotor.

In the case of a hybrid rotor of such kind the short-circuit ring contracts during the cooling process following die-casting. The aluminum ring also contracts on the inside of the short-circuit ring. When the rotor bar in the laminated rotor core is seated in the slot base and the core stack very firmly limits any movement in the direction of the shaft, the bar will not be able to readily follow the yielding inner ring. That will result in stresses between the materials and possibly in fissuring, for example on the lateral flanks and lower part of the bar. That increases overall transition resistance, which impacts disadvantageously on the asynchronous machine's performance and durability.

Countermeasures can be taken to deal with that problem. In the case of a squirrel-cage rotor they can be carried out separately or in conjunction with the above-described improvements to rotor bars and the squirrel-cage rotor.

A squirrel-cage rotor of an asynchronous machine is embodied such that a rotor bar in a laminated rotor core has a tipping point. That means that the rotor bar placed in the laminated rotor core can rock relative to a tipping point prior to casting. The tipping point is therein located not in the region of the laminated rotor core's end faces but between them, meaning inside the laminated rotor core. The system comprising squirrel-cage rotor and rotor bar can therein be embodied such that also more than one tipping point will be present. The rotor bar can therein advantageously be tipped such that its ends can be tilted toward the squirrel-cage rotor's axis. A gap is produced in the laminated rotor core's end region toward the rotor bar, with the rotor bar being able to bend in the direction of the gap. The gap therefore enables the ends of the rotor bars to bend toward the axis. That has the advantage that the bar will be able to yield to the force produced when, as the molten material solidifies, the short-circuit ring contracts and exerts a force on the bar in the direction of the squirrel-cage rotor's axis. The gap can be completely or partially closed or, as the case may be, can have become smaller when solidifying has finished.

In an embodiment of the squirrel-cage rotor at least one rotor bar has a lug. The lug protrudes from the bar and enables the bar to rock round the lug. The rotor bar can also have two lugs, these being positioned differently in the axial direction.

The nose-shaped protrusion on the bar makes it possible to yield to the contraction-induced pressure from the outer short-circuit ring. That will reduce fissuring because the outer part contracts more than the inner part of the short-circuit ring. Grooves or contours provided on the bar ends form an interlocking with the molten material. That enables a further engagement area around the bar to be moved inwardly while contraction takes place.

The supporting geometry of, for example, a steel ring can additionally reduce the contraction oriented toward the shaft. The transition resistance between bar and ring can be improved by said measures. There will be an improvement in operating characteristics and efficiency. Manufacturing-related variability in the efficiency of similar machines from the same production can moreover be reduced. That applies also to the further variants of rotor bar, laminated rotor core and squirrel-cage rotor described below.

In another embodiment of the squirrel-cage rotor the rotor bar exhibits a torsion in an axial direction, with the torsion axis extending inside the rotor bar. The rotor bar can be made to curve thereby, which is advantageous particularly when the slot into which the bar is to be inserted in the laminated rotor core is also curved.

The rotor bar can be twisted relative also to the area center of gravity, which also results in a curvature that can correspond to a curvature of a slot (slot channel) in the laminated rotor core.

Such kind of curvature of the slots, meaning of the slot channels into which the bars are placed, can in the case of a laminated rotor core be achieved by means of a plurality of rotor laminations when the rotor laminations have been displaced with respect to one another by an angle relative to an axis (in particular the rotational axis of the squirrel-cage rotor). A tipping point will also be produced in the channel by said angular displacement so that the rotor bar will not need to have a lug. The rotor bar will, though, as described above advantageously have been twisted, meaning matched to the slot's axial course prior to joining.

A slanted laminated rotor core can alternatively also be provided by a final twisting of a core already fitted with straight moldings.

The rotor laminations have for example punched recesses, with specifically a channel (slot) for the bars being produced by stacking the laminations.

In an embodiment of the squirrel-cage rotor the rotor laminations have mutual angular displacements all the same size.

The slot for the bars in the laminated rotor core can additionally or alternatively also have an axial slant which like the slant due to the angular offset of the laminations causes a tipping point to be produced.

To prevent the rotor bars from rocking while the molten material is being poured they are secured into position before casting commences. That can be done by means of, for example, wires that are wound at the bars' respective end sides around all the bars together. The winding results in a kind of wire ring around all the bars on one side of the squirrel-cage rotor.

The invention is described in exemplary fashion below and explained with reference to the exemplary embodiments shown in the figures, in which:

FIG. 1 shows an embodiment of a squirrel-cage rotor of an asynchronous machine of hybrid design, FIG. 2 shows a section through the squirrel-cage rotor, FIG. 3 shows a section through a boundary area between a coated rotor bar and a die-cast material, FIG. 4 shows another embodiment of the squirrel-cage rotor of hybrid design, FIG. 5 shows an asynchronous machine, FIG. 6 shows another embodiment of the squirrel-cage rotor, FIG. 7 shows a location of the rotor bar in the laminated rotor core, FIG. 8 shows a location of the rotor bar in the short-circuit ring, FIGS. 9 to 14 show variations of tipping designs for the rotor bar, FIGS. 15 to 30 show variations of lateral contours in the rotor bar, FIGS. 31 and 32 show variations of mechanical bonds between the rotor bar and the short-circuit ring, FIG. 33 shows a support ring for the short-circuit ring, FIGS. 34 to 37 show variations of cross-sections of the rotor bar, FIG. 38 shows a rotor bar having a channel cast in the short-circuit ring and supported by a support ring;

Figure 1:
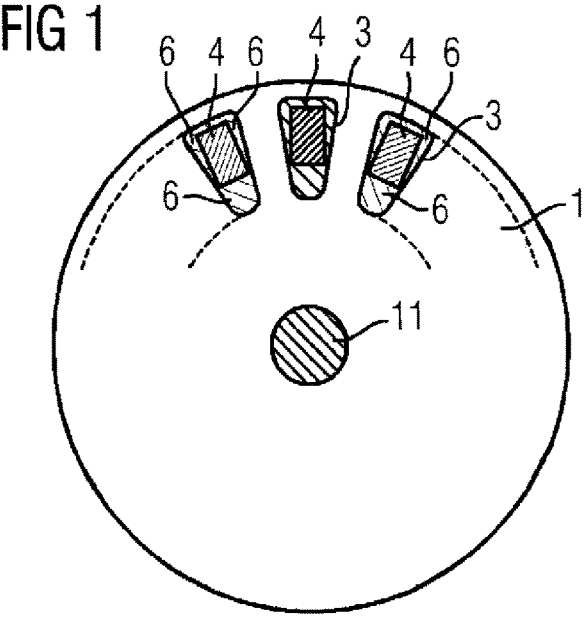
Figure 5:
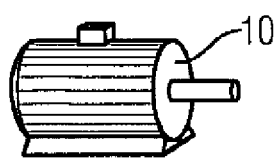

FIG. 1 shows an embodiment of a squirrel-cage rotor of an asynchronous machine of hybrid design. What is shown is a laminated rotor core 1 of the asynchronous machine, which core has been shrunk onto a shaft 11. In the production of the squirrel-cage rotor, rotor bars 4 made preferably of copper are first inserted into slots 3 of laminated rotor core 1. As can be seen, the cross-section of conductors 4 is smaller than the cross-sectional area of slots 3. A residual cross-section of slot 3 will therefore remain free when the copper bars have been inserted. A die-casting method is applied at the next step for producing the short-circuit rotor. Short-circuit rings that are in contact with the copper bars at their end face are produced by that method and the still free space in slots 3 simultaneously filled with a molten material. Aluminum bar parts 6 that fix the copper bars into position and directly adjoin them are then created inside the slots when the molten aluminum in the remaining residual cross-section has solidified. Said aluminum bar parts 6 can advantageously be used also as starting bars of the asynchronous machine because they have a lower electrical conductivity than the copper conductors. Especially when, differently from what is shown, aluminum bar parts 6 are arranged in the slot's radially outwardly oriented region (see FIG. 41) they will have a positive effect on the torque curve of asynchronous machine 10 shown by way of example in FIG. 5.

The hybrid structure, meaning the use of bars 4 made of copper and of short-circuit rings made of aluminum, makes it possible to produce a squirrel-cage rotor exhibiting a particularly high level of electrical efficiency. That is due on the one hand to the good conductivity of copper and on the other to the relatively low weight of the short-circuit rings made of aluminum, the result of which is a corresponding relatively low inertia around the rotating axis.

Figure 2:
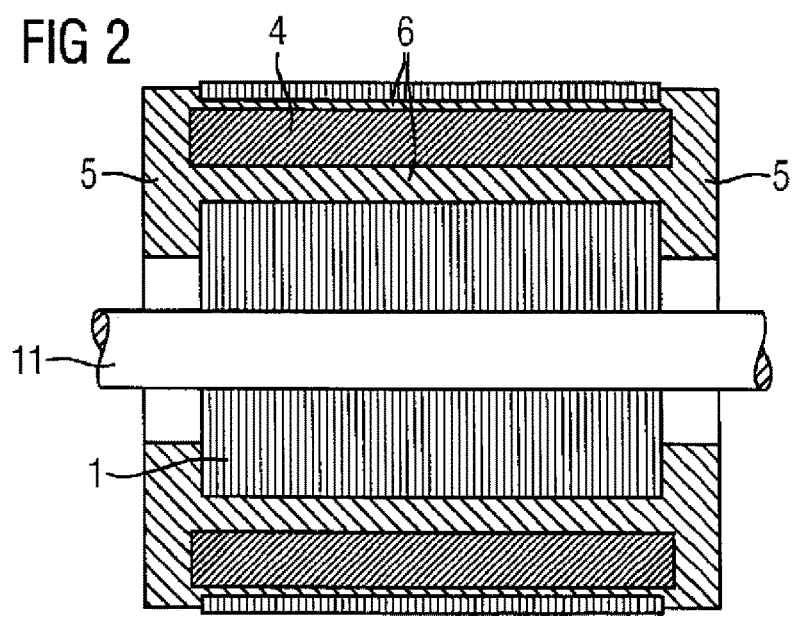

FIG. 2 shows a section through the squirrel-cage rotor where what can be seen alongside laminated rotor core 1 are bars 4 surrounded by the molten aluminum and inserted into slots 3. Said conductors 4 dip at their end faces into short-circuit rings 5 made of die-cast aluminum. Temperature differences to which the squirrel-cage rotor is subjected while the machine is operating can cause bars 4 that have been inserted to become detached from short-circuit rings 5 especially in the end regions. That can be explained in particular by the different coefficients of thermal expansion of copper and aluminum, the materials used. It is therefore important in the case of a hybrid rotor of such kind to ensure a stable bond between the two materials copper and aluminum especially in the region of short-circuit rings 5.

Figure 3:
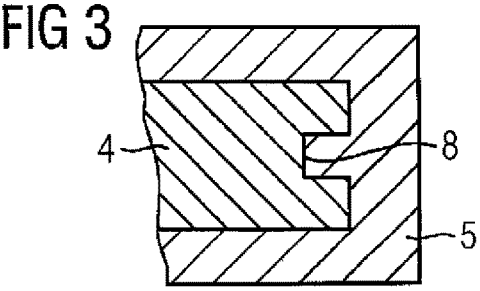

FIG. 3 shows a rotor bar 4 which has a slot 8 on an end face. Slot 8 has a tangential orientation relative to the squirrel-cage rotor. Rotor bar 4 in short-circuit ring 5 is mechanically stabilized through the molten material's entering into slot 8 when short-circuit ring 5 is cast.

Figure 4:
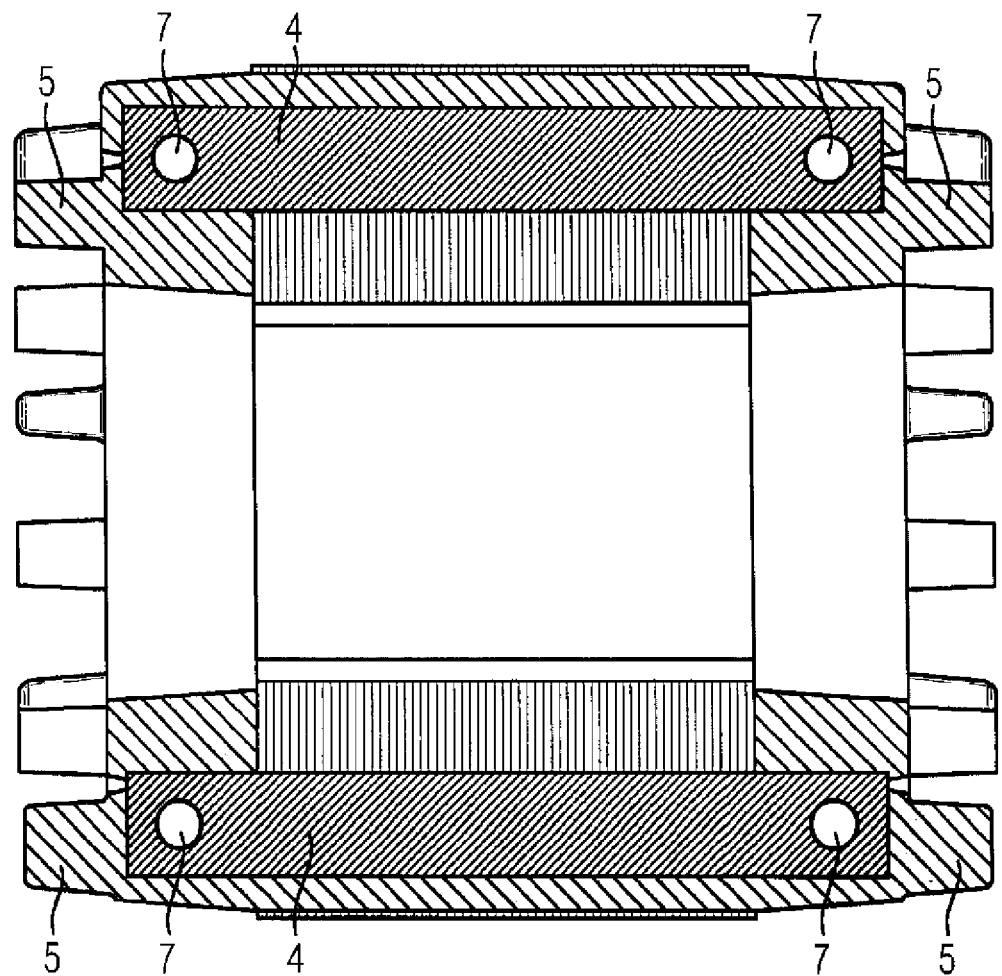

FIG. 4 is a sectional view of another embodiment of the squirrel-cage rotor of hybrid design having rotor bars 4 that have form-fitting means 7 in the region of short-circuit rings 5. Form-fitting means 7 of rotor bars 4 are embodied as through-holes. Form-fitting means 7 will be interspersed with molten aluminum as soon as the laminated rotor core fitted with rotor bars 4 is subjected to the aluminum die-casting method. The result is that a form-fit bond will additionally ensure that rotor bars 4 maintain their bond in the region of short-circuit rings 5 during the thermal cycles. Form-fitting means 7 that are shown thus act to prevent the end faces of the conductors from being pulled out of die-cast short-circuit rings 5.

Figure 6:
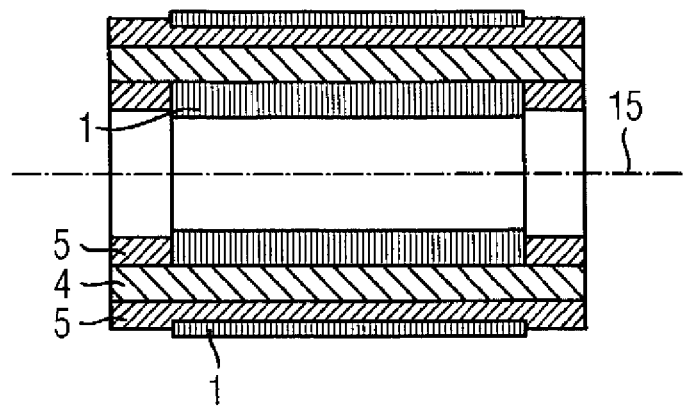

FIG. 6 shows a squirrel-cage rotor in which the rotor bars are resting in the slot base. Casting will consequently take place only on the side of the rotor bar facing away from an axis 15, with short-circuit rings 5 not being considered herein.

Figure 7:
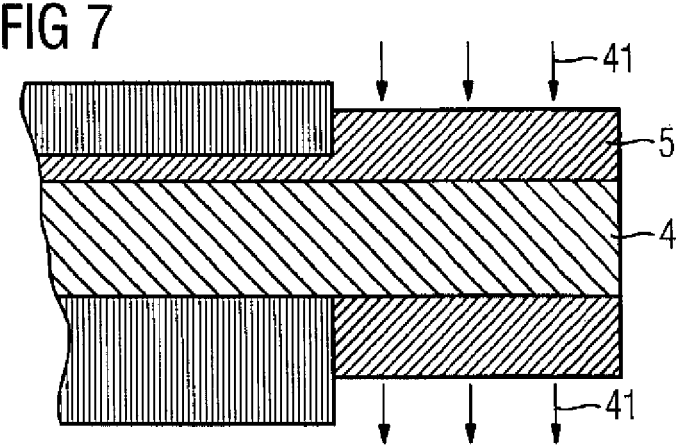
Figure 8:
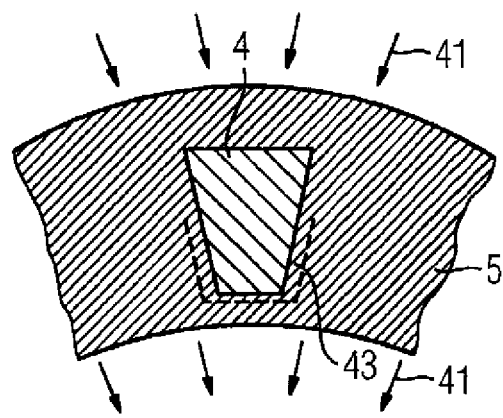

In FIG. 7 it is shown how forces act upon one end of rotor bar 4 while short-circuit ring 5 cools. The forces are symbolized by arrows 41. Said forces can cause rotor bar 4 and short-circuit ring 5 to forcibly separate resulting in a fissure gap 43 which is shown in FIG. 8.

Figure 9:
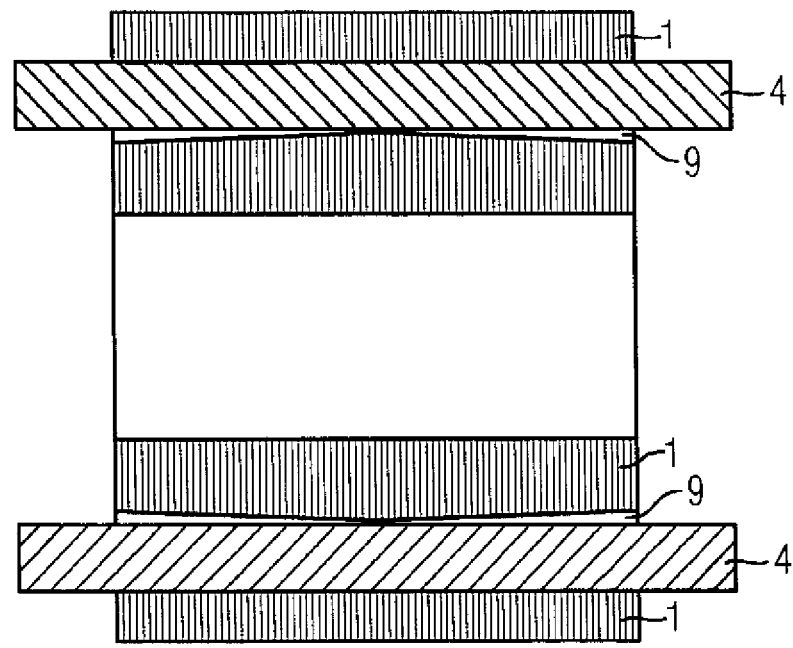

FIG. 9 shows a laminated rotor core 1 into which rotor bars 4 have been placed, with the base of the closed slot in laminated rotor core 1 being angled such as to produce a gap 9. Rotor bar 4 can move into said gap 9 because of the forces arising while the molten material is cooling. Stresses can be reduced thereby.

Figure 10:
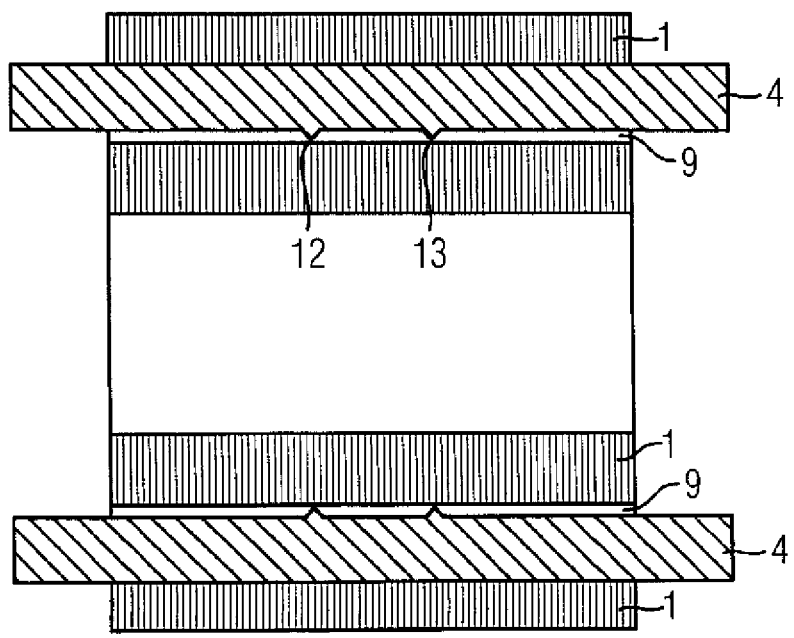

In an embodiment variant according to FIG. 10, gap 9 is produced by means of lugs 12 and 13 on the rotor bar.

Figure 11:
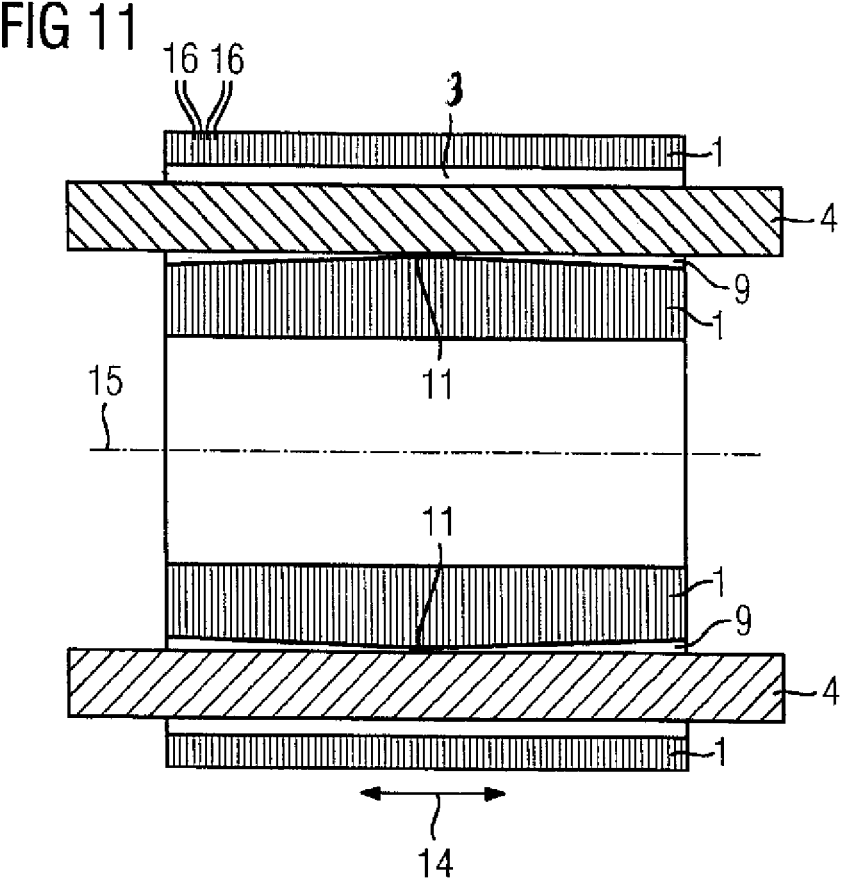

FIG. 11 shows a laminated rotor core 1 in the case of which rotor laminations 16 have a mutual angular offset such as to form a curved closed slot 3 for rotor bars 4. That measure results also in a gap 9 and, furthermore, a tipping point 11. Rotor bar 4 is able in the non-encapsulated condition to tilt about said point 11. Said point 11 is located centrally in an axial direction 14.

Figure 12:
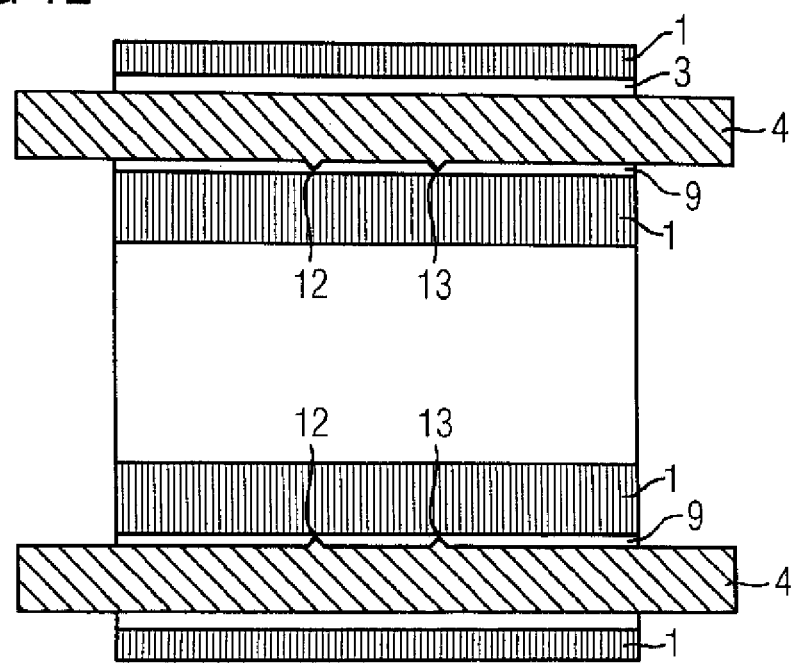
Figure 33:
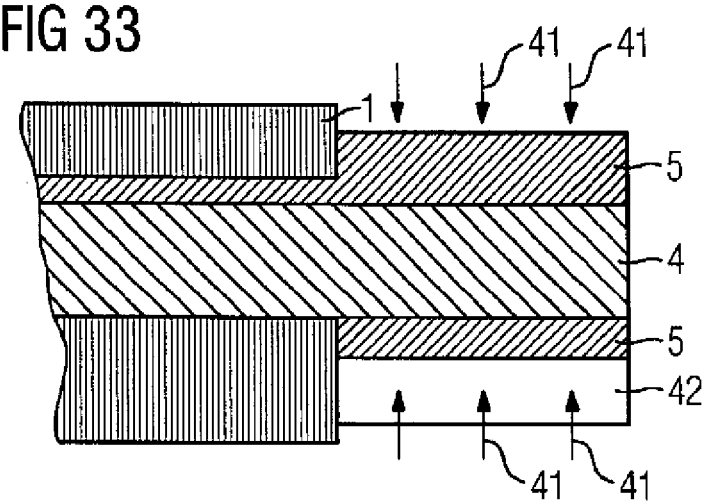

Bar 4 can advantageously be twisted around the center angle in the case of a slanting embodiment of slot 3 as present here. As a result, the bar makes contact, for example, only in the center of the core stack. The curvature in the slanting core stack produces a small gap 9 between slot base and bar at the ends of the core. The bar will consequently be able to follow the contraction of the aluminum short-circuit ring. Forcible separating will be avoided. In the case of straight core stacks the inserted bars are provided on the side facing the slot base with a protrusion (lug 12, 13), produced preferably by stamping. FIG. 12 shows a relevant instance. An outwardly accruing structure can moreover, as already described, have grooves applied to the bar that have been stamped, for example, although that is not shown in the figure. To prevent the inner part of short-circuit ring 5 from separating through contraction it is possible also for a supporting geometry such as a support ring 42 to be provided as shown in FIG. 33. A steel ring serving that purpose can have been cast at the same time.

Figure 13:
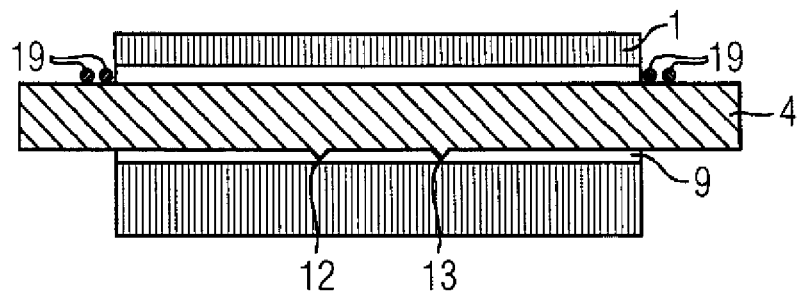
Figure 14:
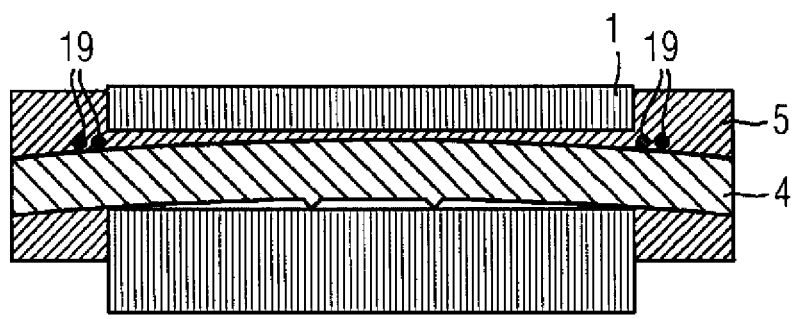

FIG. 13 shows a rotor bar 4 having two tipping points 12, 13. Tipping points 12, 13 are situated in a region of rotor bar 4 facing the squirrel-cage rotor's axis 15 (see FIG. 11). Rotor bar 4 can curve around tipping points 12 and 13. A wire 19 is wound around the rotor bars (all of them together, not individually) to fix them into position during encapsulation. FIG. 14 shows how bars 4 are bent inward (toward the axis) after encapsulation and how they were able to do so. Gap 9 is closed at its ends on the end faces of laminated rotor core 1.

Figure 15:
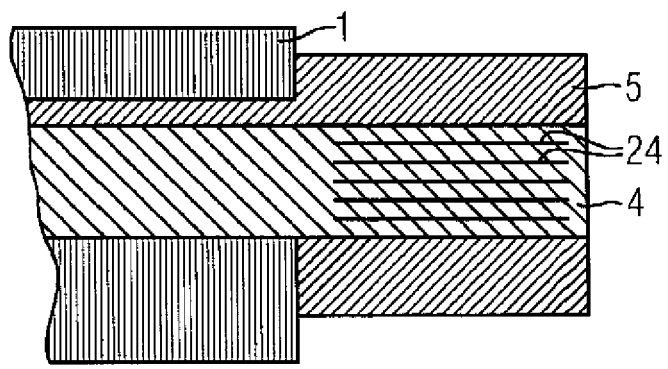
Figure 16:
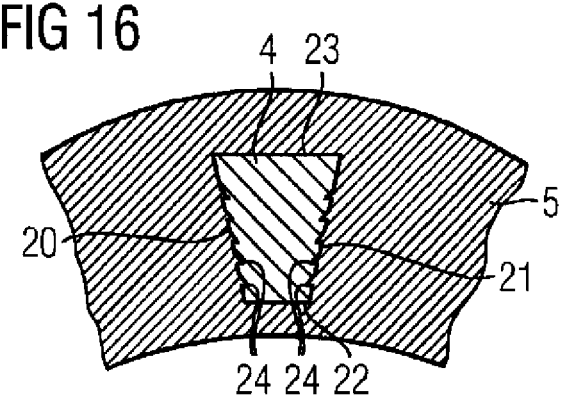

FIG. 15 shows grooves 24 in rotor bar 2 in the region of short-circuit ring 5. Grooves 24 are axially oriented. For better clarity of illustration, FIG. 16 is an axial section showing grooves 24 in profile. Also shown are the rotor bar's radial outer faces 20, 21 and tangential outer faces 22, 23.

Figure 17:
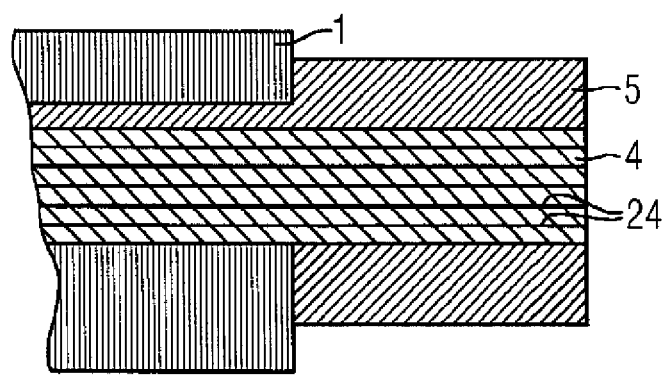

FIG. 17 shows that grooves 24 can also extend into the region of laminated rotor core 1.

Figure 18:
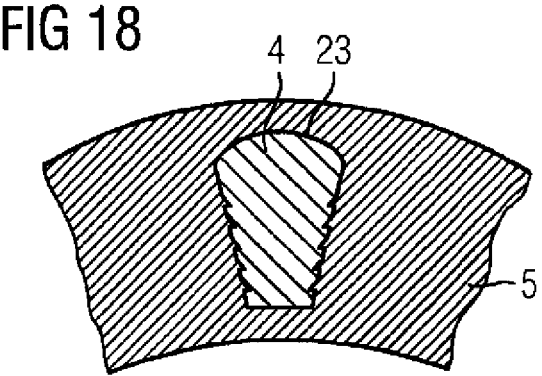

FIG. 18 shows as another example of an embodiment variant of bar 4 a modified geometry of rotor bar 4 having a domed outer tangential outer face.

Figure 19:
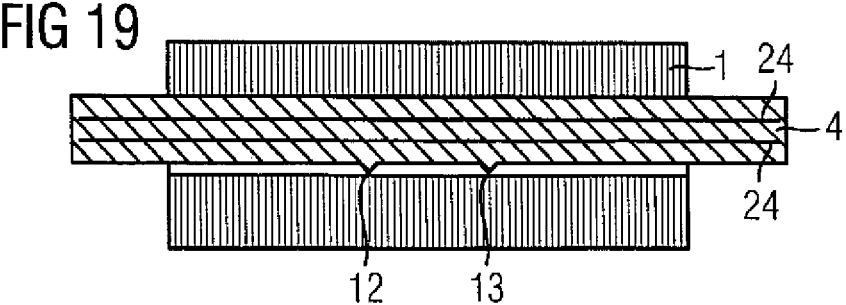
Figure 20:
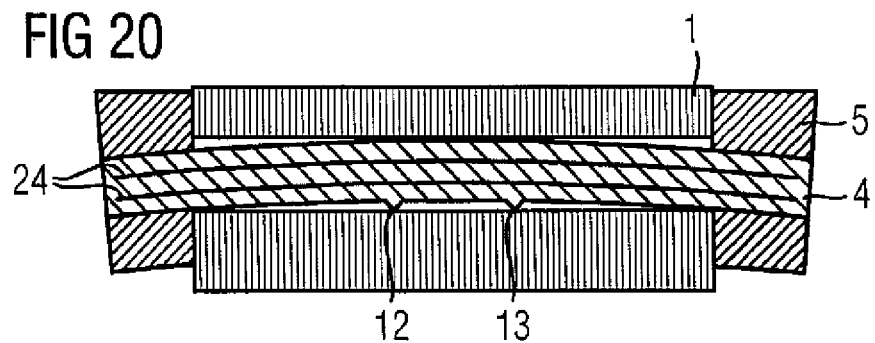

FIG. 19 shows a bar 4 which has lugs 12 and 13 and grooves 24 in addition. FIG. 20 analogously shows the bending of bar 4 after short-circuit ring 5 has cooled.

Figure 21:
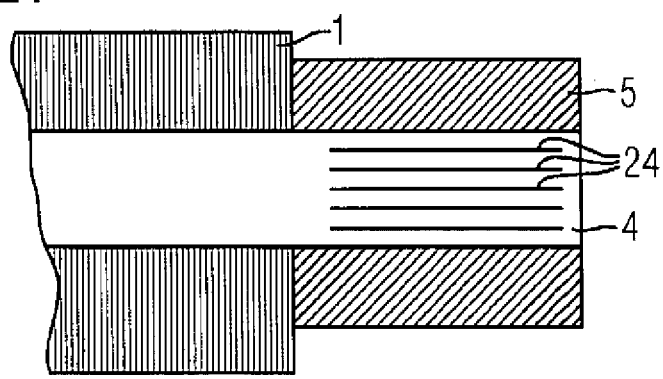
Figure 22:
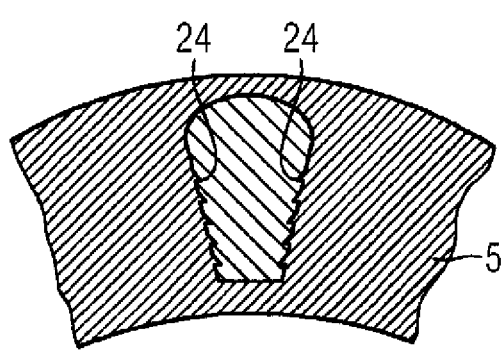
Figure 23:
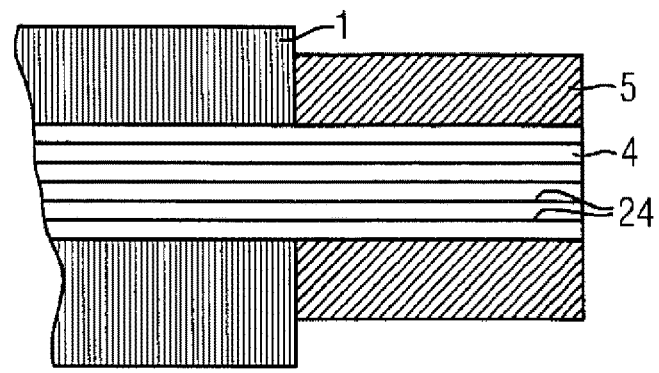

FIG. 21 shows a bar 4 that is located without a gap in the laminated rotor core but for better adhesion to short-circuit ring 5 has grooves 24. Shown in FIG. 22 is a corresponding section through bar 4 extending perpendicularly to the rotor's axis. Corresponding thereto, FIG. 23 shows that grooves 24 can extend across an axial length of bar 4 in that kind of embodiment also.

Figure 24:
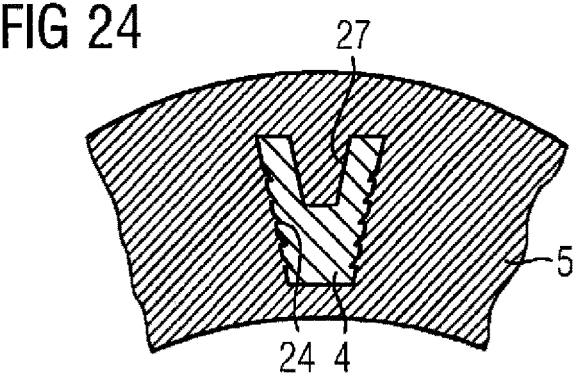
Figure 25:
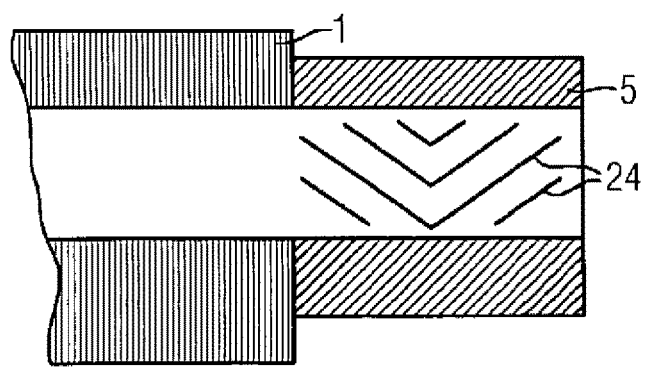
Figure 26:
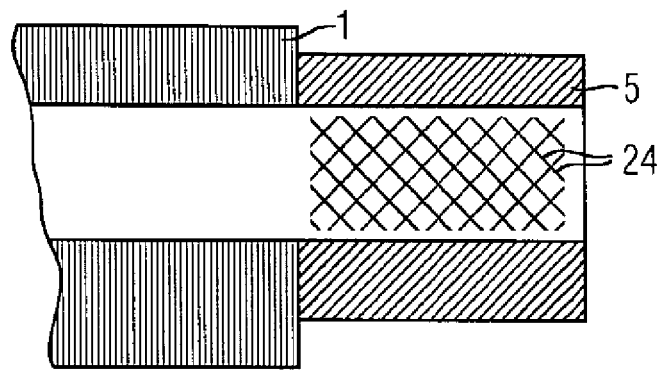
Figure 27:
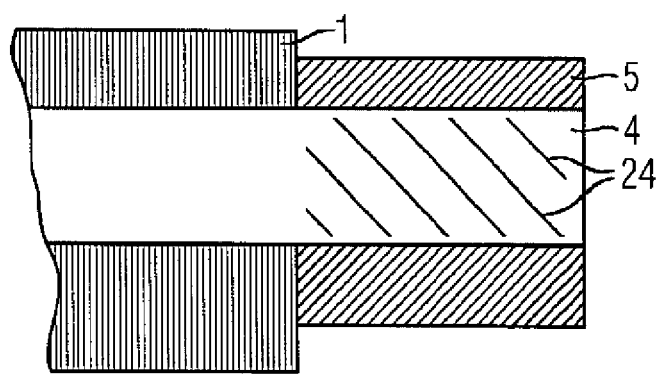
Figure 28:
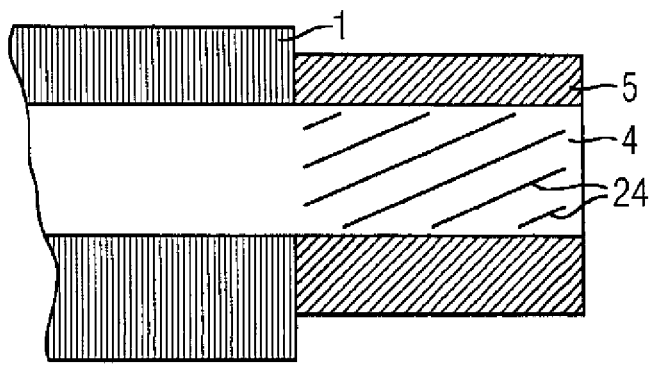
Figure 29:
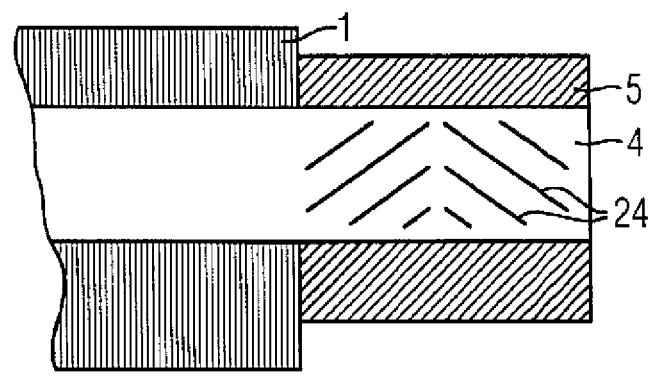
Figure 30:
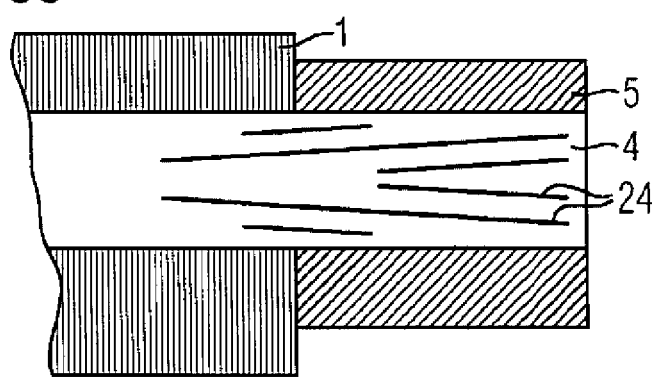

FIG. 24 shows a bar 4 which in addition to grooves 24 also has a channel 27.

FIGS. 25 to 30 show all kinds of orientations and courses of grooves 24 serving to provide better adhesion of casting material to bar 4.

Figure 31:
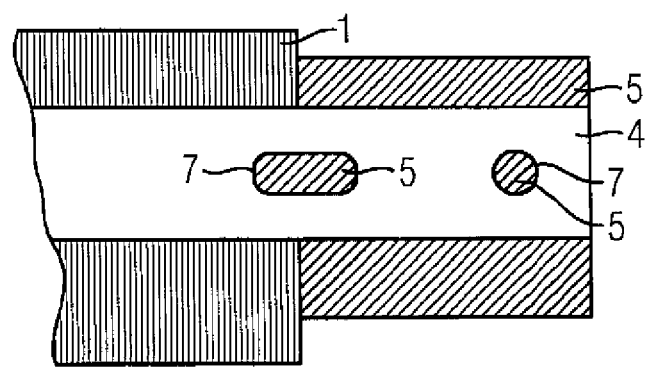

FIG. 31 shows through-holes 7 that are filled with, for example, aluminum (casting material) and constitute a part of electrical short-circuit ring 5.

Figure 32:
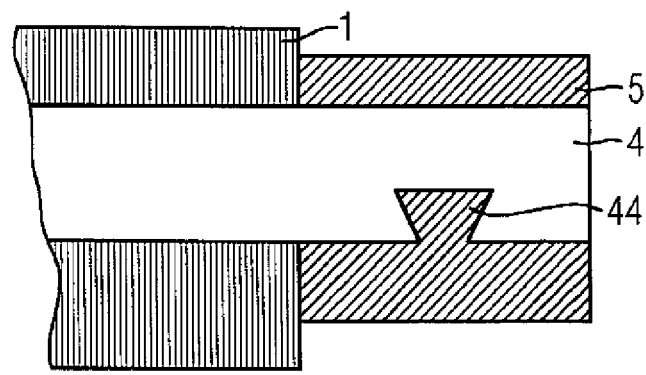

A dovetail-like geometry 44 of a bar 4 can also be provided for better mechanical bonding as shown in FIG. 32 between short-circuit ring 5 and rotor bar 4.

FIG. 33 shows a support ring that can absorb forces 41 arising through cooling of the molten material for short-circuit ring 5.

FIGS. 34 to 37 show by way of example different profiles (cross-sections) of grooves 24. What is further shown is that a slot 24 can have, for example, an arched cross-section 25 or a wedge-shaped cross-section 26.

According to FIG. 37, a rotor bar can have two channels, namely a radially outwardly oriented channel 27 and an opposite radially inwardly oriented channel in the slot base. Further shown in FIG. 37 is how support ring 42 supports short-circuit ring 5.

Figure 41:
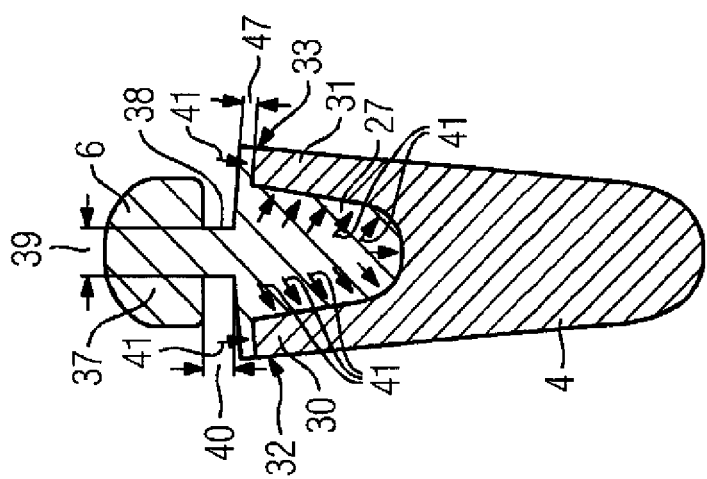
FIG. 41 shows a rotor bar in the closed slot in the laminated rotor core.
Figure 40:
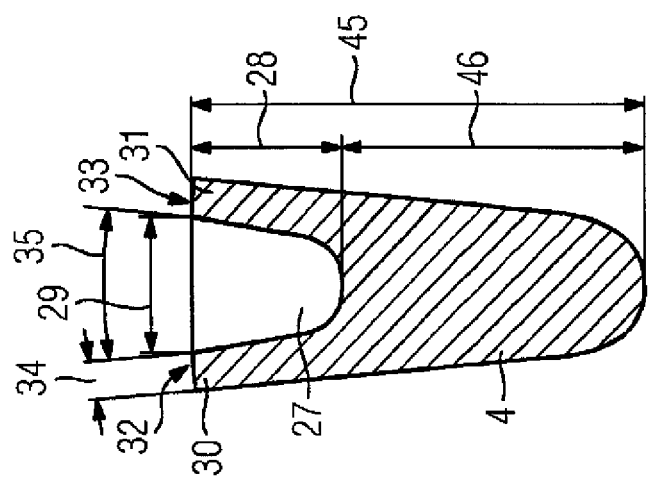
FIG. 40 shows a rotor bar having a casting channel for the molten material.
Figure 39:
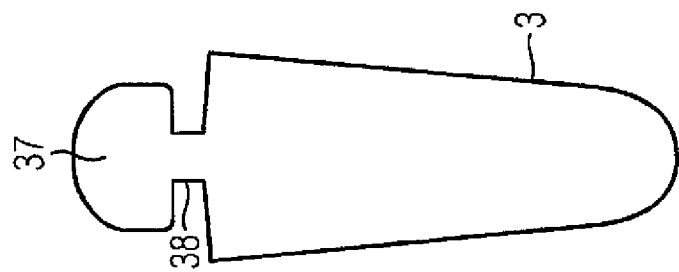
FIG. 39 shows a closed slot in the laminated rotor core.

FIG. 39 shows a closed slot 3 as is provided in the laminated rotor core for accommodating the bars. Slot 3 has a constriction 38 which divides slot 3 into a primary casting channel 37 and a part in which to place the bar. A corresponding bar 4 is shown in FIG. 40. Bar 4 has an overall height 45 and a channel 27. Channel 27 has a floor (slot base) from which a slot-base height 46 is produced. Channel 27 has a depth 28 and an opening width 29. The opening has an opening angle 35. Channel 27 is bounded by limbs 30 and 31 which at their ends form shoulders 32 and 33. The shoulder has a width 34 that is smaller than opening width 29. FIG. 41 shows how bar 4 is situated in slot 3, with the aluminum having already been cast so that aluminum bar part 6 will also already have been embodied. FIG. 41 further shows the constriction's height 40 and its width 39. Arrows 41 indicate what forces the molten material being pushed in under pressure exerts on bar 4. Pressure is therein exerted both laterally on limbs 30 and 31 and on shoulders 32, 33 because there is a further space of height 47 for molten material on the shoulders.

Figure 42:
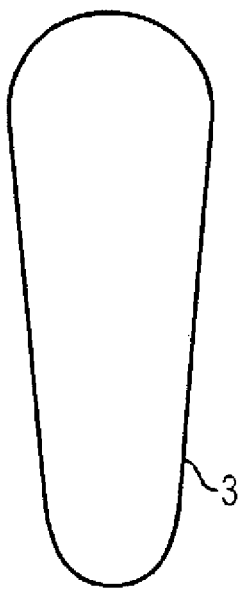
FIG. 42 shows another closed slot in the laminated rotor core.
Figure 43:
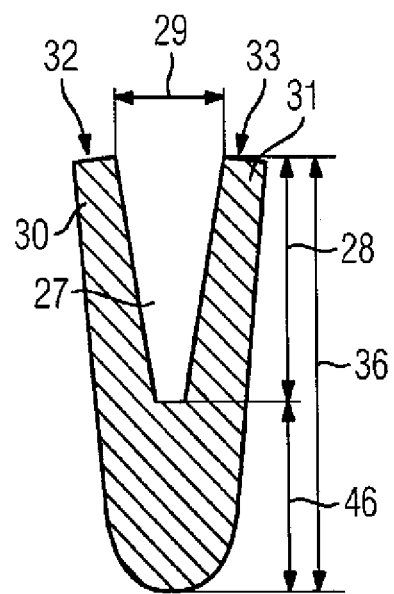
FIG. 43 shows another rotor bar having a casting channel for the molten material.
Figure 44:
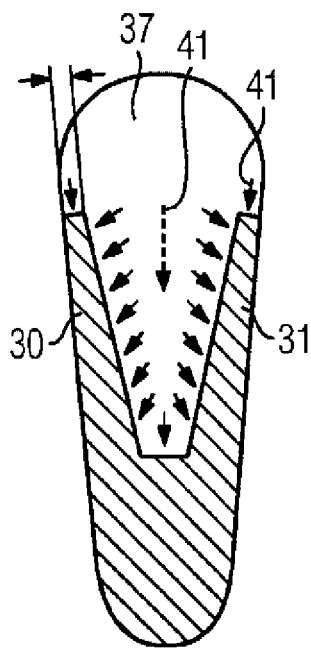
FIG. 44 shows the other rotor bar in the other closed slot in the laminated rotor core.

FIG. 42 shows as an alternative to FIG. 39 another possible shape for the cross-section of slot 3. FIG. 43 shows analogously thereto an alternative shape for bar 4. What is noticeable therein is that channel depth 28 is greater than slot-base height 46. Similarly to FIG. 41, FIG. 44 also shows how bar 4 comes to rest in slot 3, with the molten material not being shown in FIG. 44.

Figure 45:
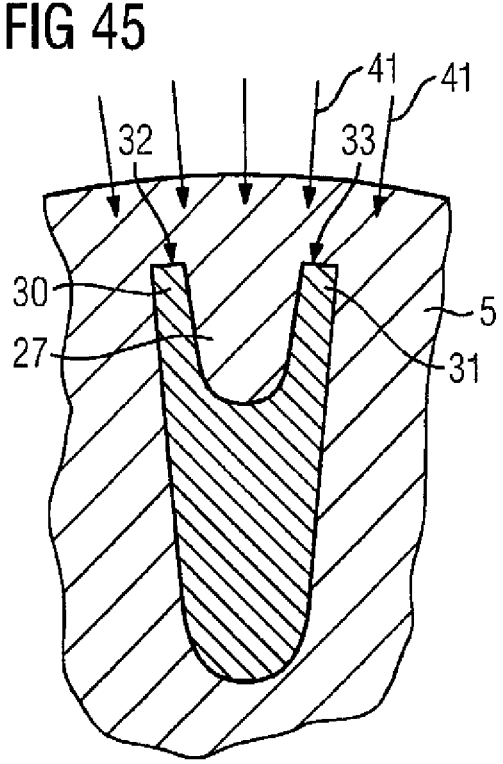
FIG. 45 shows the rotor bar having a channel for casting encapsulated in the short-circuit ring.

FIG. 45 shows in a section transversal to the axis how bar 4 having channel 27 has been cast into short-circuit ring 5 and how forces 41 directed toward the axis act thereupon.

What is claimed is:

1. A rotor bar of a squirrel-cage rotor of an asynchronous machine, comprising tangential outer faces and radial outer faces, said radial outer faces being contoured to define an engagement area to permit a movement of the rotor bar inwardly when a short-circuit ring has been cast at an end face onto a laminated rotor core of the squirrel-cage rotor by die-casting and contracts, wherein a contractible die-casting material of the short-circuit ring fills a slot in the laminated rotor core and fixes the rotor bar in the slot on a radially inwardly oriented slot base, wherein the rotor bar and the material of the short-circuit ring in the slot form a cage bar of the squirrel-cage rotor, wherein said engagement area has grooves extended along and inclined with respect to a rotational axis of the rotor as well as being inclined to each other and the rotational axis.

2. The rotor bar of claim 1, wherein the grooves of the engagement area are provided at an end of the rotor bar and form an interlocking engagement with molten material as the short-circuit ring is cast.

3. The rotor bar of claim 1, wherein the grooves have an arched cross-section.

4. The rotor bar of claim 1, wherein the grooves have a wedge-shaped cross-section.

5. The rotor bar of claim 1, grooves intersect one another.

6. The rotor bar of claim 1, further comprising a channel bounded by opposite first and second limbs of the rotor bar to thereby define first and second shoulders, respectively, and an opening between the first and second limbs, said opening being defined by an opening width which is greater than a width of the first and second shoulders.

7. The rotor bar of claim 6, wherein the channel is defined by a depth which corresponds to 013 times to 3 times the opening width.

8. The rotor bar of claim 6, wherein the first and second limbs are configured to define an opening angle of 25° to 50°.

9. The rotor bar of claim 6, defined by a height, said channel having a depth which is greater than half the height of the rotor bar.

10. A squirrel-cage rotor, comprising:
   a laminated rotor core having a slot;
   a short-circuit ring made of a contractible first material cast onto the laminated rotor core at an end face of the laminated rotor core; and
   a rotor bar received in the slot of the laminated rotor core to form a conductor, said rotor bar being made of a second material having a specific electrical conductivity which is higher than a specific electrical conductivity of the first material, said rotor bar having tangential outer faces and radial outer faces, said radial outer faces being contoured to define an engagement area to permit a movement of the rotor bar inwardly when the short-circuit ring has been cast at an end face onto the laminated rotor core by die-casting and contracts, wherein said first material cast of the short-circuit ring fills a slot in the laminated rotor core and fixes the rotor bar in the slot on a radially inwardly oriented slot base, wherein the rotor bar and said first material cast in the slot form a cage bar of the squirrel-cage rotor, wherein said engagement area has grooves extended along and inclined with respect to a rotational axis of the rotor as well as being inclined to each other and the rotational axis.

11. The squirrel-cage rotor of claim 10, wherein the grooves of the rotor bar are provided at an end of the rotor bar and form an interlocking engagement with the first material as the short-circuit ring is cast.

12. The squirrel-cage rotor of claim 10, wherein the rotor bar has a channel bounded by opposite first and second limbs of the rotor bar to thereby define first and second shoulders, respectively, said rotor bar being sized to occupy only a part of a cross-section of the slot, said first material being introduced via a casting channel so as to be able to wet the first and second shoulders.

13. The squirrel-cage rotor of claim 12, wherein the casting channel has a constriction.

14. The squirrel-cage rotor of claim 10, wherein the rotor bar is made of copper.

15. The squirrel-cage rotor of claim 10, wherein the first material is aluminum, said rotor bar forming a cage together with the first material.

16. The squirrel-cage rotor of claim 10, wherein the rotor bar has in the laminated rotor core a tipping point about which the rotor bar is moveable.

17. The squirrel-cage rotor of claim 16, wherein the tipping point is situated in a region of the rotor bar facing an axis of the laminated rotor core.

18. The squirrel-cage rotor of claim 16, wherein the rotor bar curves around the tipping point.

19. The squirrel-cage rotor of claim 10, wherein the rotor bar has a lug in confronting relationship to a slot base.

20. The squirrel-cage rotor of claim 19, wherein the rotor bar has two of said lug.

21. The squirrel-cage rotor of claim 10, wherein the slot has a curved configuration formed by an angular displacement of the rotor laminations.

22. The squirrel-cage rotor of claim 10, further comprising a wire wound around the rotor bar.

* * * * *